United States Patent [19]
Ewertowski et al.

[11] 4,326,624
[45] Apr. 27, 1982

[54] PALLET FEEDER

[75] Inventors: Norbert Ewertowski, Dietzenbach-Steinberg, Fed. Rep. of Germany; Herbert Janser, Zürich, Switzerland

[73] Assignee: Werkzeugmaschinenfabrik Oerlikon-Bührle AG, Zürich, Switzerland

[21] Appl. No.: 940,775

[22] Filed: Sep. 8, 1978

[30] Foreign Application Priority Data

Sep. 14, 1977 [CH] Switzerland ............ 11212/77

[51] Int. Cl.³ .................................. B65G 47/46
[52] U.S. Cl. ............................ 198/370; 198/472; 198/372; 104/35; 104/88
[58] Field of Search .................. 198/339–341, 198/349, 350, 362, 365, 366, 370, 414, 472, 480, 495, 736, 747, 748, 803, 372; 104/35, 88; 414/134, 259, 263, 280; 29/33 P, 563

[56] References Cited

U.S. PATENT DOCUMENTS

| 849,970 | 4/1907 | Boyton | 104/35 |
|---|---|---|---|
| 3,055,517 | 9/1962 | Kirkland | 414/259 |
| 3,588,243 | 6/1971 | Osawa et al. | 198/803 |
| 4,010,856 | 3/1977 | Anderson | 414/280 |
| 4,014,428 | 3/1977 | Ossbahr | 198/339 |
| 4,070,972 | 1/1978 | Folsom et al. | 198/485 |

FOREIGN PATENT DOCUMENTS

| 2162133 | 6/1973 | Fed. Rep. of Germany | 198/372 |
|---|---|---|---|
| 2754095 | 7/1978 | Fed. Rep. of Germany | 198/472 |

OTHER PUBLICATIONS

"Werkstatt und Betrieb", 106, (1973) 9, by Dr. Pabler et al., pp. 679–690.
"Werkstattstechnik Wt", 4, 1973, by Mr. Scharf et al., pp. 199–206.

*Primary Examiner*—Joseph E. Valenza
*Attorney, Agent, or Firm*—Werner W. Kleeman

[57] ABSTRACT

A pallet feeder for a manufacturing plant or fabrication system wherein pallets are fed along a substantially circular-shaped track or path of travel. A number of transfer stations or locations are provided at which the pallets are infed and outfed essentially at right angles to the circular-shaped conveying path or track. At the center of the circular-shaped pallet feeder there is located a pallet displacement device which is pivotable about the axis of the circular-shaped track into a position coacting with the different transfer stations or locations, in order to be able to move the pallets towards and away from the conveying or conveyor track.

8 Claims, 9 Drawing Figures

PALLET FEEDER

BACKGROUND OF THE INVENTION

The present invention relates to a new and improved construction of pallet feeder for feeding pallets along a substantially circular-shaped track or path of travel and having a random number of pallet receivers equipped with pallet guides arranged essentially at right angles to the feed or conveying direction and movable into a number of transfer positions, and furthermore, the pallets being automatically shifted in the direction of the pallet guides onto the pallet receivers.

Such type pallet feeders having a rotatable platform which can rotate through 180° into two angular positions, carrying only two pallet receivers, also are known to the art as pallet changers. Each pallet receiver has operatively associated therewith a pallet thrust of push drive. By means of each pallet thrust drive the pallets are alternately moved to and from the work machine. Both identical pallet thrust drives have the same displacement path and two holding or stop positions which limit the thrust displacement path. In fabrication systems or manufacturing plants having conveying paths or conveyor systems of different construction and configuration each working or work machine has operatively associated therewith a pallet changer serving as the interface or connection unit to the conveying path or track.

It is known to design the conveying track as a circular conveyor having four pallet receivers without any pallet thrust drives, as the same has been disclosed in the publication "Werkstatt und Betrieb" 106, (1973) 9; "Werkstattstechnik WT" 4, 1973, for the fabrication system known under the commercial designation "PRISMA M250" having ten pallet positions or places and two working machines. Also with this system design each working machine has operatively associated therewith a pallet changer for charging the machine and a third pallet changer serves for charging the circular conveyor from the chucking station.

Also there have been proposed to the art pallet changers whose rotatable platform likewise carries four pallet receivers and is rotatable into four 90°-positions. To render possible in each position a pallet transfer without shift of the pallet changer each pallet receiver has operatively associated therewith a pallet thrust drive. These pallet thrust drives are identical and have the same thrust displacement path including two stop or holding positions which limit the thrust displacement path. Such a system is the subject of a co-pending application Ser. No. 867,968, filed Jan. 9, 1978, which corresponds to German Pat. No. 2,754,095, of which Norbert Ewertowski is the sole inventor.

SUMMARY OF THE INVENTION

Hence, with the foregoing in mind, it is a primary object of the present invention to provide a new and improved construction of pallet feeder affording improved prerequisites for the economic fabrication thereof as well as enabling economical and adaptable utilization of fabrication systems or manufacturing plants.

Still a further significant object of the present invention aims at providing a new and improved construction of pallet feeder for a manufacturing plant, which is relatively simple in construction and design, extremely reliable in operation, economical to manufacture and operate, and not associated with the aforementioned drawbacks and limitations of the prior art proposals.

Still a further significant object of the present invention is directed to an improved construction of pallet feeder for a fabrication system or manufacturing plant which allows better utilization and adaptability of the fabrication system, while insuring for highly reliable, efficient and accurate pallet feeding operations, while employing a pallet feeder which is relatively simple in design and construction, easy to use, highly economical to manufacture, and not readily prone to disturbances and the like.

Now in order to implement these and still further objects of the invention, which will become more readily apparent as the description proceeds, the pallet feeder of the present development for feeding pallets in a fabrication system or manufacturing plant along a substantially circular-shaped track or path of travel, comprises pallet receivers having pallet guides arranged substantially at right angles to the conveying or feed direction and movable into a number of transfer positions. The pallets are automatically displaceable upon the pallet receivers in the direction of the pallet guides. According to important aspects of the invention a plate thrust drive is arranged at the central region or center of the pallet feeder so as to be rotatable about an essentially vertical axis into a number of angular positions independently of the circular-shaped pallet feeding. The thrust or pushing force of the pallet thrust drive, in the angular positions, is effective in the direction of the related pallet guide or guide means of a pallet receiver which is located in a transfer position.

The pallet feeder of the present invention has the following advantages worthy of mention:

1. A reduced constructional expenditure, because the functions of pallet feeding and pallet change are united in one unit having only one pallet thrust drive, even in the case of a greater number of pallet receivers. Consequently, there is rendered superfluous the need for additional separate pallet changers having a number of pallet thrust drives, rotary drives and control devices.

2. A more adaptable and simpler construction, because the pallet thrust drive can be effective for a number of thrust lengths in random thrust directions and in each thrust direction. As a result, there can be designed more price favorable fabrication systems, which are suitable for use both with independent, manually controlled machine charging and requisite good accessibility to the machine table as well as also being capable of accomplishing a centrally controlled, dependent charging for automatic single stage and multi-stage operation.

3. There is afforded a space saving construction for exclusively centrally controlled fabrication systems which can operate, without the need for manual manipulations, at the palletized workpieces at the machine.

4. In the case of larger fabrication systems having pallet cars or the like it is possible to interlink a number of the inventive pallet feeders at a spacing from one another which is coordinated to the distance between the working machines and without the need for any additional pallet thrust devices, and such are effective as a buffer having a high capacity. The work or working machines are directly charged by the pallet feeders, and between such, in the case of multi-stage operation, there is a direct pallet flow which relieves the pallet cars. Even in critical phases of a 3/1-shift operation of the plant and with flexible operating procedures with a number of different types of workpieces having different fabrication priorities there can be avoided downtime of the machines.

5. Particularly in the case of multi-stage operation and intensive material machining work it is oftentimes desired to perform an intermediate cleaning prior to carrying out further processing of the workpieces at the next working machine. The inventive pallet feeder fulfills this requirement without the need for special transport means and with small equipment expenditure and spatial demands.

BRIEF DESCRIPTION OF THE DRAWINGS

The invention will be better understood and objects other than those set forth above, will become apparent when consideration is given to the following detailed description thereof. Such description makes reference to the annexed drawings wherein.

DETAILED DESCRIPTION OF THE PREFERRED EMBODIMENTS

Figure 4:
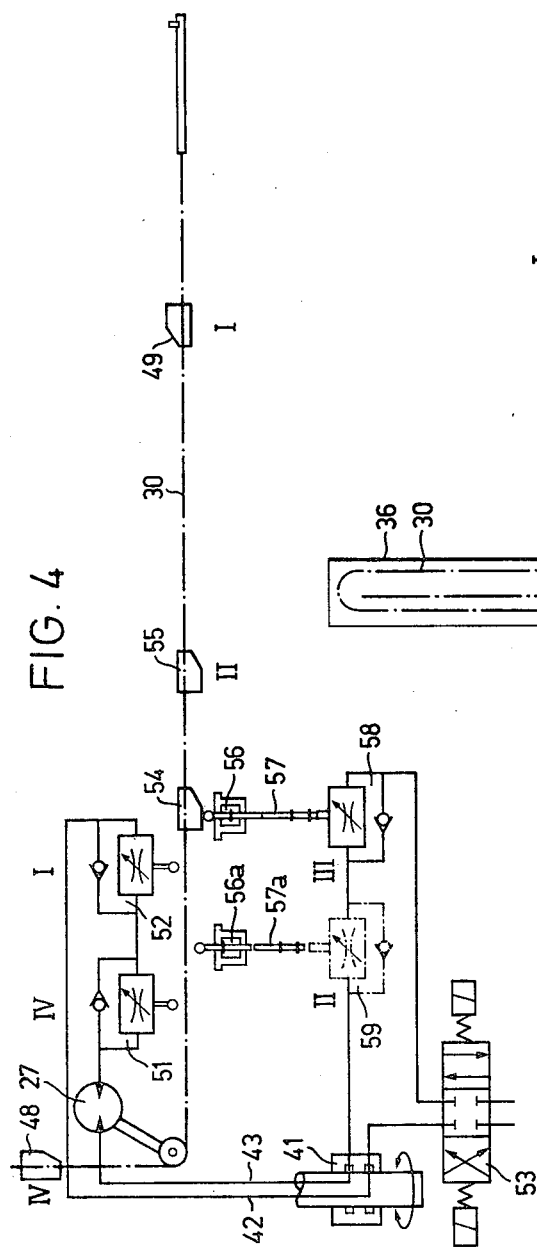
FIG. 4 schematically illustrates a control of the chain thrust drive of the arrangement of FIG. 1.
Figure 1:
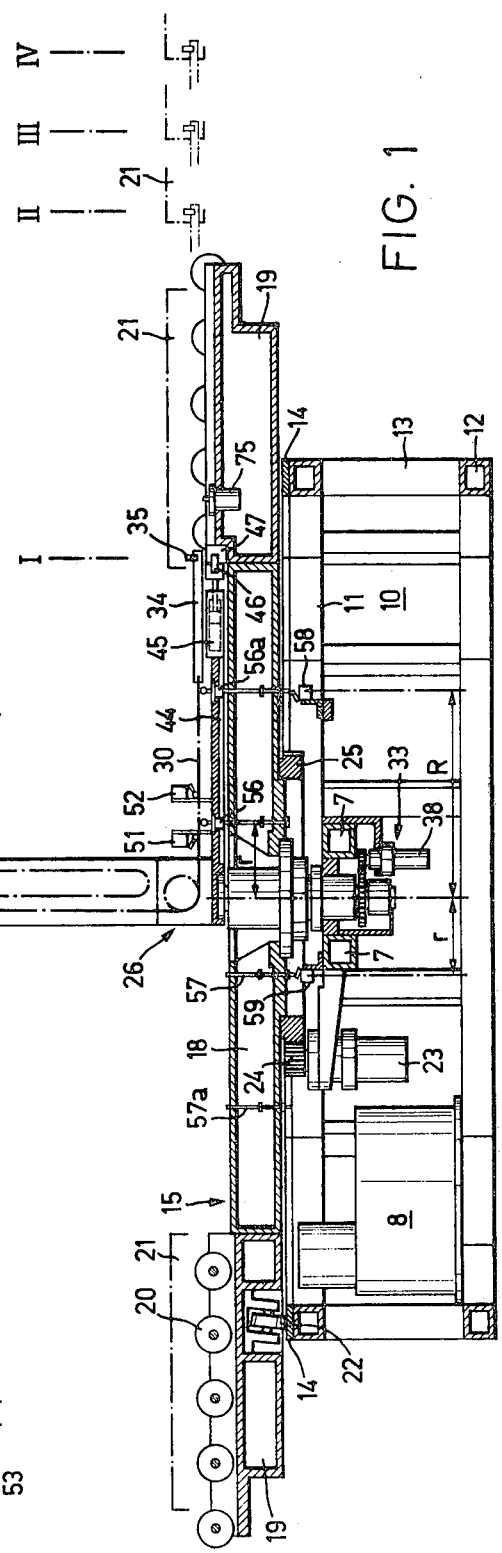
FIG. 1 is a vertical total sectional view through a pallet feeder having eight pallet receivers and a chain thrust drive, taken substantially along the line I—I of FIG. 2.
Figure 2:
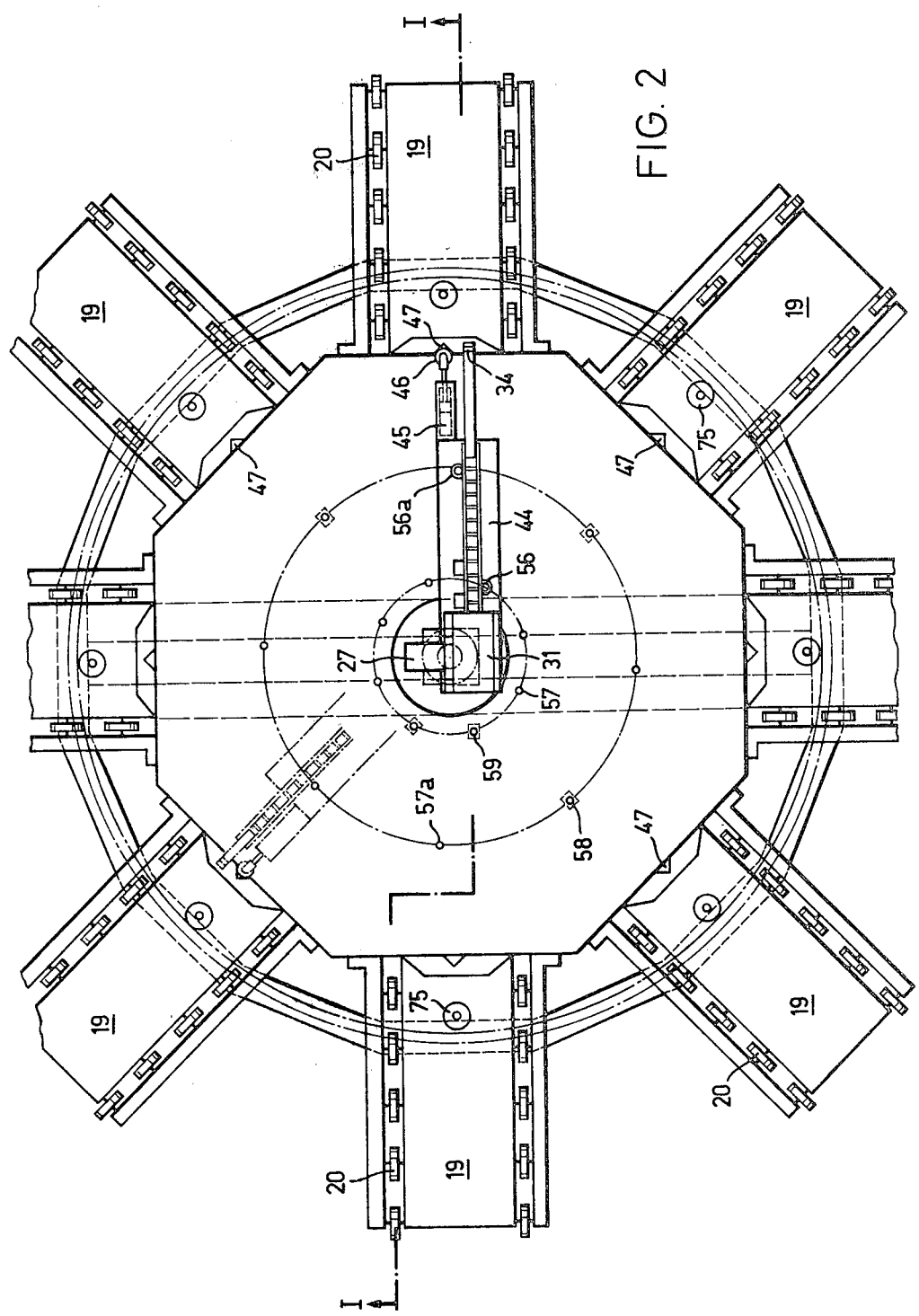
FIG. 2 is a top plan view of the pallet feeder shown in FIG. 1.
Figure 3:
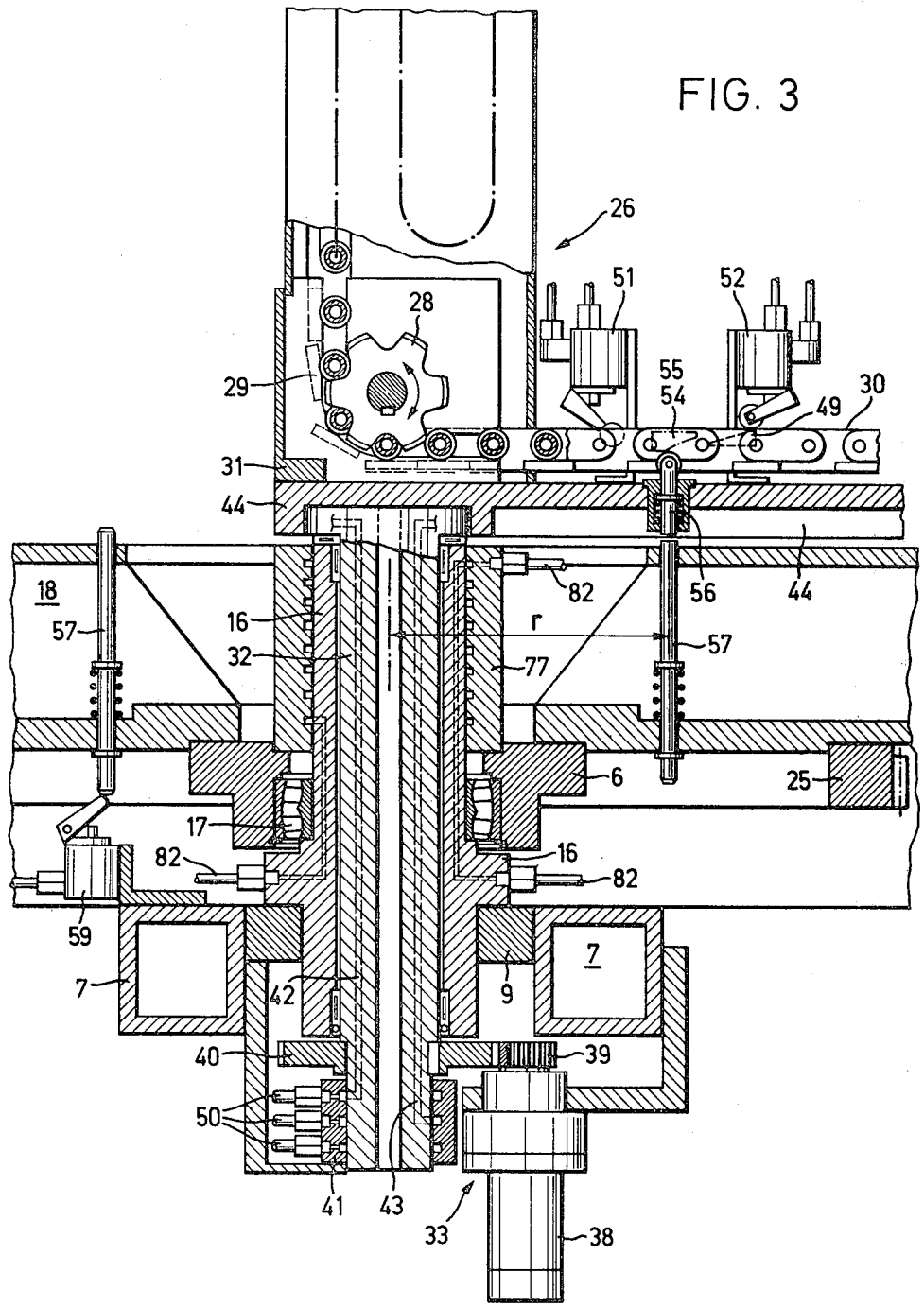
FIG. 3 is an enlarged vertical fragmentary sectional view of the arrangement of FIG. 1.

Describing now the drawings, the exemplary embodiment of pallet feeder or pallet conveying device as illustrated in FIGS. 1, 2 and 3 will be seen to comprise a pedestal or base 10 which essentially is composed of two multi-cornered rings 11 and 12 interconnected with one another by vertical supports or posts 13 or equivalent structure. At the underside of the upper ring or ring member 11 there are threadably connected or otherwise fastened two transverse supports or carriers 7 between which there is fixed, typically for instance as by welding, the base hub 9. The top surface or face of the upper ring 11 is structured as a substantially ring-shaped support track or path composed of hardened plates or plate members 14 upon which there is mounted a rotatable platform 15. This rotatable platform 15 is centered by means of a bearing journal or pin 16 flanged perpendicular to the base hub 9 and the roller bearing or roller bearing means 17. An hydraulic-control unit or assembly 8 is arranged within the hollow base or pedestal 10.

The rotatable platform 15 consists of an eight-cornered intermediate or central part 18 at whose eight substantially upright or vertical outer walls 8a there are fixed, as by threading or screwing thereat, eight pallet receivers or receiver means 19. Each pallet receiver 19 embodies at its upper surface a pallet guide or guide means, generally designated by reference character 19a, constituted by the rolls or rollers 20 and upon which there are radially displaceable the pallets 21 shown in broken lines in FIG. 1. At the underside of each pallet receiver 19 there are provided two recesses 19b in which there are mounted at total of sixteen substantially cone-shaped support rolls or rollers 22 which roll upon the plates 14 and support the rotatable platform 15. In order to drive the rotatable platform 15 through 45°-angular positions there is provided a hydromotor 23 arranged within the base 10 and having a pinion 24 which meshes with a toothed rim or ring gear 25 threadably or otherwise connected with the intermediate or central part 18.

For radial displacement of the pallets 21 there is arranged centrally of the pallet feeder a pallet thrust or push drive 26, which, in the embodiment under discussion, comprises a finite chain 30 functioning as the thrust element. As best seen by referring to FIG. 3, the chain links 30a of the chain 30 are provided in conventional manner at their lower or left side of such showing with a respective impact or stop plate 29 in order to prevent any upwardly directed kinking of the chain under load and also to render possible a free-supporting pushing-out action. The chain 30 is moved in both directions by means of a hydromotor 27 or equivalent structure through the agency of a drive gear or wheel 28 and at its outer end there is attached a coupling element or piece 34 which coacts with pallet latches or pawls 35 or equivalent structure. During chain movement the inner end of the chain 30 winds-up and winds-off within a guide frame 36 located at the support or bearing housing 31 for the hydromotor 27 and the drive wheel or gear 28. The support or bearing housing 31 is threadably arranged coaxially with regard to the bearing journal 16 at the upper face of an arm 44, which, in turn, is flanged at the upper end face of an adjustment sleeve 32 rotatably mounted in the bore 16a of the bearing journal or pin 16. By means of an angle orientation or angle positioning device 33 it is possible to turn the adjustment sleeve 32 together with the arm 44 and the bearing or support housing 31 independent of the rotatable platform 15.

The angle orientation or angle positioning device 33 comprises a stepping motor 38 having a step-down gearing 43 and attached to the transverse strut or support 7. The pinion 39 of the stepping motor 38 cooperates with a spur gear 40 which is keyed or otherwise fixed below the bearing pin or journal 16 at the protruding or overhang part of the adjustment sleeve 32. The stepping motor 38 can be controlled in such a fashion that the adjustment sleeve 32, the arm 44, the support or bearing housing 31 and, thus, the thrust direction of the chain 30 can be oriented in any required 45°-angular position. In FIG. 2 there is shown in broken or phantom lines a thrust direction which is not situated in the plane of the drawing of FIGS. 1 and 3. For the precise fixation of each thrust or pushing direction there is advantageously employed the arm or arm member 44 together with the indexing-piston drive 45. This indexing-piston drive 45 has an indexing roll or roller 46 which is mounted at the end of the piston rod 45a and cooperates with an indexing prism or lock member 47 or equivalent structure located at each pallet receiver 19.

As best seen by referring to FIGS. 1, 2, 3 and 4 the impingement of the hydromotor 27 for purposes of pallet shifting or displacement is accomplished by the infeed bushing or sleeve 41 mounted at the lower end 32a of the adjustment or setting sleeve 32. For this purpose, there are utilized two of the three connections or infeed lines 50 of the infeed bushing 41 and the oil or other fluid bores 42 and 43 located in the adjustment sleeve 32. The third connection and a third not particularly illustrated oil or fluid bore serve for the impingement at one face of the indexing-piston drive 45, the resetting of which is accomplished by means of, for instance, a spring which has not been particularly shown in order to improve the clarity of illustration.

With this exemplary embodiment of pallet feeder which has a great number of applications, the coupling element or piece 34 with or without the pallets 21 can be moved into an inner thrust position I and three outer thrust positions II, III and IV. It is possible to move into the inner thrust position I for any angular position of the pallet thrust drive 26, whereas it is only possible to move alternately into the other thrust positions II, III, and IV as will be explained more fully hereinafter in conjunction with the description of the fabrication system. In order to control the thrust positions I and IV there are arranged at one side of the chain 30, in a switching track, two upwardly effective switching or indexing elements 48 and 49. These switching elements 48 and 49 can activate two flow regulating valves 51 and 52 located at the arm 44 and connected in series, these valves, in turn, in conjunction with standard and therefore not particularly shown signal transmitters and together with an electromagnetic valve 53 arranged in the hydraulic-control unit 8 initiate the movement into the thrust positions. By shifting the position of the switching element 48 at the chain 30 it is possible to accommodate the maximum thrust displacement path, with unaltered pallet feeder, to the requirements of the relevant fabrication system or manufacturing plant. At the inner, non-altered switching position I the pallets 21 are fixedly arrested at the pallet receivers 19 by means of the arresting or fixing cylinder 75 and at the same time the pallet pawls 35 are raised into their free position, as will be likewise explained more fully hereinafter. In this free position of the pallet pawls 35 it is possible for the angle orientation or positioning device 33 to rotate the pallet thrust or pushing drive 26 into the angular orientation or position needed for the next pallet transfer.

The movement of the coupling element or piece 34 out of the thrust position I into the thrust positions II or III is controlled by the series connected flow regulating valves 58 and 59 which are arranged at a spacing "r" and "R", respectively, related to the axis of rotation of the rotatable platform 15, in the base 10 in a number and angular position as required by the transfer positions of the relevant fabrication system. Actuation of the flow regulating valves 58 and 59 is accomplished by means of the switching elements 54 and 55 which are downwardly effective and arranged at both chain sides and in two further switching tracks, by means of the plungers 56 and 56a and the plunger rods 57 and 57a, respectively. The switching element or piece 54 can act in the one switching track, against spring force, upon the plunger 56 which is vertically guided at the arm 44 at the spacing "r", and the switching element or piece 55 can act at the other switching track, against spring force, upon the vertically guided plunger 56a in the arm 44 at the spacing "R". In order to transmit the switching stroke of the plungers 56 and 56a there is provided at the intermediate or central part 18 of the rotatable platform 15 of each pallet receiver 19 a respective vertically guided plunger or piston rod 57 at a smaller pitch circle diameter of $2 \times$"r" and a respective vertically guided plunger or piston rod 57a at a larger pitch circle diameter $2 \times$"R". The plunger rods 57 and 57a are retained, by upwardly effective spring forces and stop rings, in the non-biased or non-impinged state of the control circuit, at a small spacing with regard to the lower ends of the plungers 56 and 56a, so that the rotatable platform 15 and the pallet thrust drive 26 together with the arm 44 can rotate without contact and independently of one another.

Figure 5:
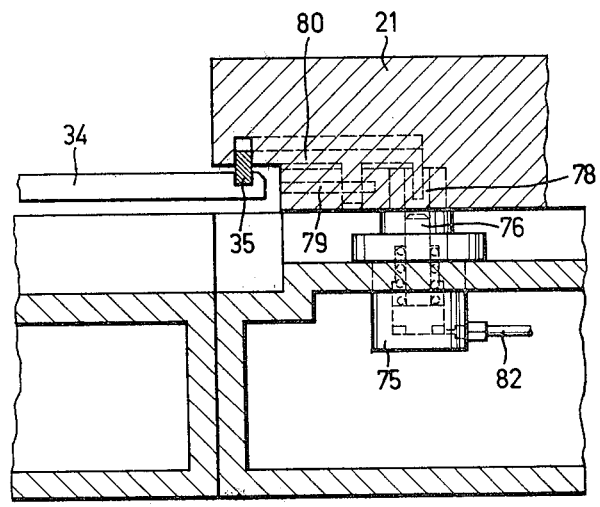
FIG. 5 is an enlarged vertical fragmentary sectional view showing a detail of the arrangement of FIG. 1, specifically a pallet pawl in its coupled-in position.
Figure 6:
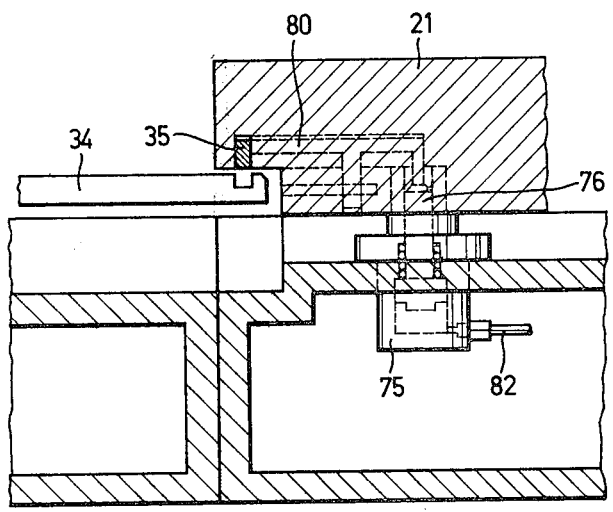
FIG. 6 is a fragmentary sectional view, like the showing of FIG. 5, however illustrating the pallet pawl in its free position.

Mounted at each pallet receiver 19 is an arresting or stop cylinder 75 whose upward or vertically extending piston rod 76, during the inward movement of the pallets 21 up to the inner thrust position I, can be downwardly held under the action of spring pressure, as best seen by referring to FIG. 5. After completion of the moving-in operation the relevant arresting cylinder 75 is pressure loaded or impinged by the infeed bushing or sleeve 77 from the hydraulic-control unit 8 via the lines or conduits 82. The infeed bushing or sleeve 77 is fixed at the bearing flange 6 of the rotatable platform 15 and bears at the bearing pin or journal 16. The piston rod 76 penetrates into the pallet bore 78 and presses an angle lever 80 which is mounted to be pivotable about the bolt or pivot shaft 79 at the pallet 21 together with the pallet pawl 35 which is fixed at such angle lever 80 upwards into a position where it is released or freed from the coupling element 34 (FIG. 6).

Figure 7:
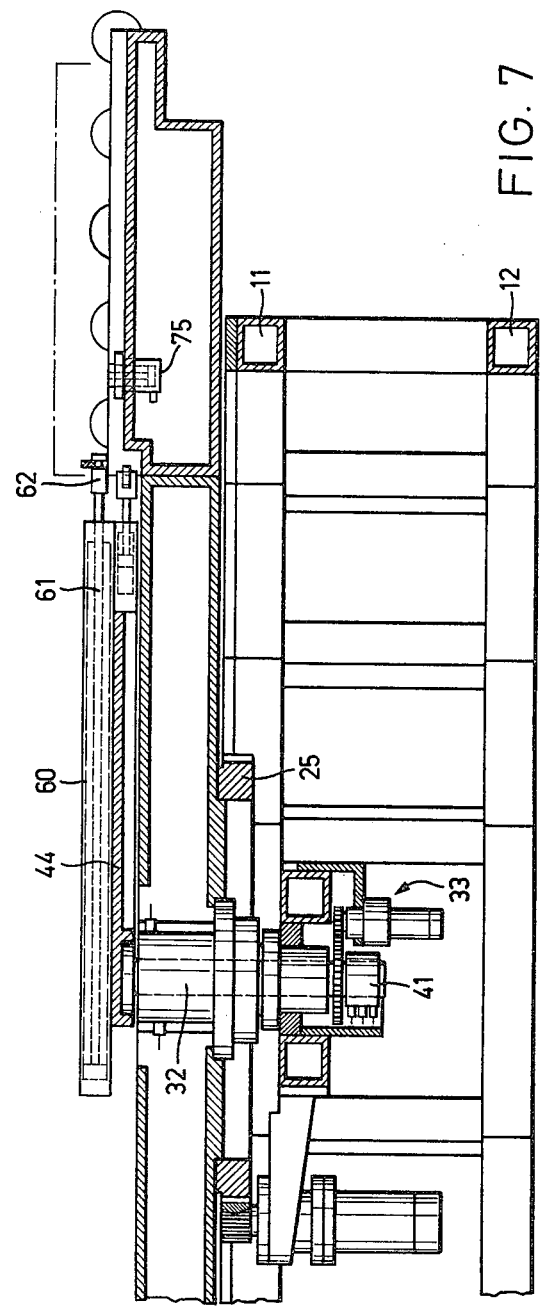
FIG. 7 is a vertical total sectional view, like the showing of FIG. 1, however illustrating a modification employing a work cylinder as the pallet thrust drive.

Continuing, in FIG. 7 there is shown the simplest construction of a pallet feeder according to the invention for use with approximately eight pallet receivers and which can be employed for direct pallet transfer to the working or work machine with short pallet displacements. In this case, during the assembly of the pallet feeder, there is threadably connected at the support or arm member 44, instead of the chain thrust drive, a work cylinder 60 which can be directly impinged or loaded by the infeed bushing or sleeve 41. The piston rod 61 of the work cylinder 60 is displaceable into two stop or impact positions by means of a coupling piece or element 62 located at the outer end 61a of such piston rod 61.

Figure 8:
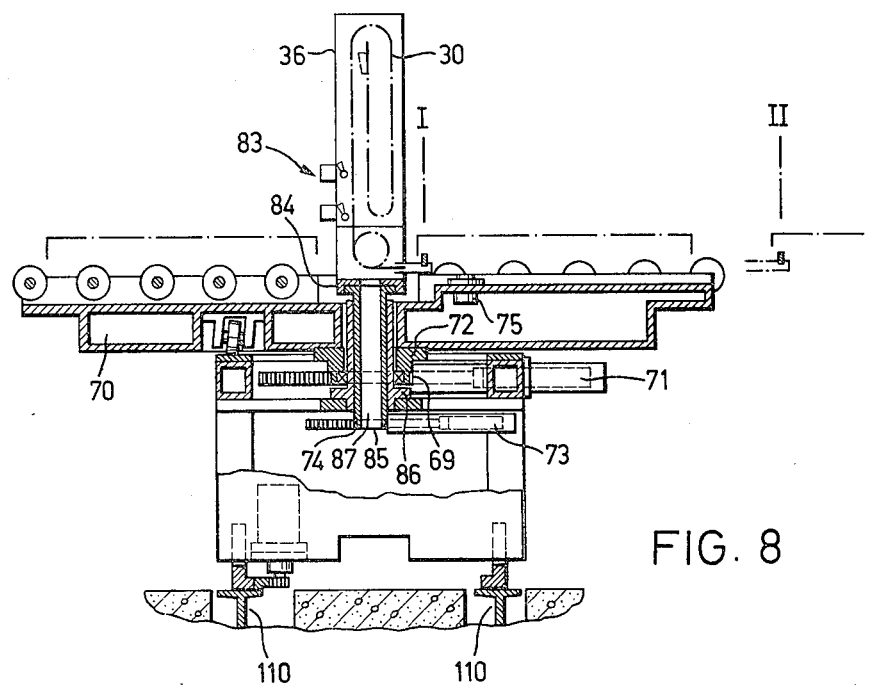
FIG. 8 is a vertical sectional view through a pallet feeder having two pallet receivers and pallet thrust device effective in two thrust directions.

FIG. 8 illustrates a pallet feeder having a one-part rotatable platform 70 and two pallet receivers. The pallet thrust or push drive 83 which works with a chain 30, and which pallet thrust drive 83 is centered and threadably or otherwise affixed by means of a plate 84 at the upper end face of the adjustment or setting sleeve 85, allows for a central application of force during the pallet shifting or displacement, notwithstanding the fact that the pallet receivers are arranted in a space saving manner closely adjacent one another at the rotatable platform 70. This construction is especially rendered possible by virture of the fact that the chain 30 winds-up in guide frame 36 arranged coaxially with respect to the bearing journal or pin 86. It is here to be remarked that the prior art likewise space-saving pallet changers exhibit at each longitudinal side of the rotatable platform a respective work cylinder for pallet displacement with lateral application of the force, which disadvantageously causes corner moments and requires additional guide elements. The 180°-rotation of the rotatable platform 70 is accomplished by means of the toothed-piston drive 71 which coacts with a radial or end tooth arrangement 69 of the bearing hub 72 flanged to the rotatable platform 70. The pallet thrust drive 83 has two thrust positions I and II. Furthermore, for the angular positioning of such pallet thrust drive 83 in its two 180°-positions there is advantageously provided a small toothed piston drive 73 which engages with an end or radial tooth arrangement 74 formed at a lower end of the adjustment or setting sleeve 85. The energy infeed to the arresting cylinders 75 and the hydromotor of the pallet thrust drive 83 is accomplished by means of not particularly shown, but conventional flexible lines which are guided through the large bore 87 of the adjustment sleeve 85.

Figure 9:
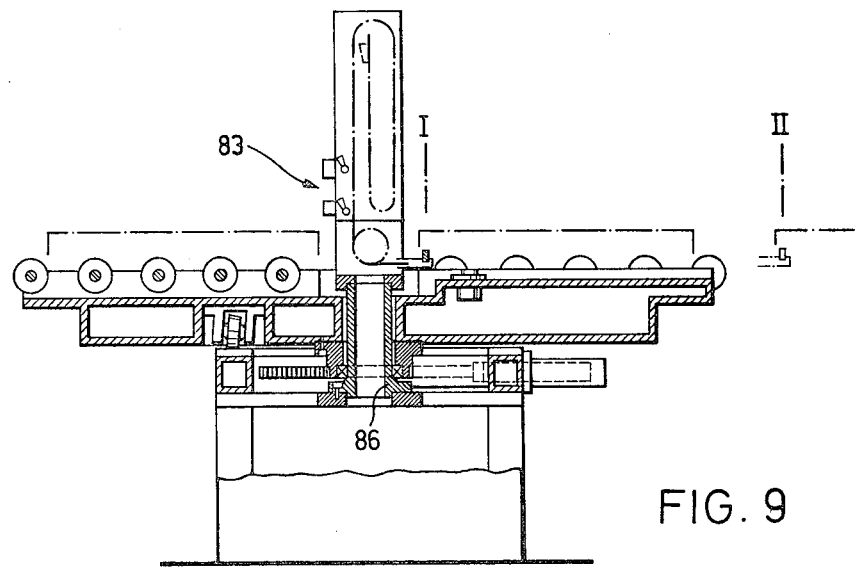
FIG. 9 is a vertical sectional view, like the showing of FIG. 8, however illustrating a modification wherein the pallet thrust device is effective in one thrust or pushing direction.

Finally, in FIG. 9 there is shown a pallet changer similar to the arrangement of FIG. 8, which however accomplishes a pallet change or feed only in one thrust or displacement direction. The pallet thrust drive 83 is fixedly mounted upon the bearing pin or journal 86, and there is dispensed with any angle orientation or positioning device. Advantages worthy of mention of this constructional embodiment, derived from the principles of the invention, are the extremely accommodatable thrust lengths of only one pallet thrust drive and the central application of force during the pallet shifting or displacement with compact structure of the equipment.

While there are shown and described present preferred embodiments of the invention, it is to be distinctly understood that the invention is not limited thereto, but may be otherwise variously embodied and practiced within the scope of the following claims.
ACCORDINGLY,

What we claim is:

1. A pallet feeder for a fabrication system having a pallet feed along a substantially circular-shaped path of travel, comprising:
   support means defining a substantially circular-shaped track;
   rotatable platform means mounted on said circular-shaped track for feeding said pallets along a substantially circular-shaped path of travel;
   pallet receivers fixed on said rotatable platform means;
   pallet guide means arranged on said pallet receivers and directed essentially perpendicular to the feed direction of said pallets;
   means for rotating said rotatable platform means with said pallet receivers into a number of transfer positions and onto which pallet receivers said pallets can be automatically shifted in the direction of said pallet guide means;
   a pallet thrust drive arranged substantially at the center of said pallet feeder;
   means rotatably mounting said pallet thrust drive for movement into a number of angular positions about an essentially vertical axis and independent of the movement of said rotatable platform means; and
   said pallet thrust drive being effective to engage a pallet arranged on said pallet guide means of said pallet receiver located in a transfer position for displacing said pallet in the feed direction.

2. The pallet feeder as defined in claim 1, further including:
   an adjustment sleeve having an upper end face secured to the pallet thrust drive;
   a bearing journal for rotatably supporting said rotatably platform;
   said bearing journal having a bore; and
   said adjustment sleeve being mounted in said bore of said bearing journal.

3. The pallet feeder as defined in claim 1, further including:
   an adjustment sleeve provided for the pallet thrust drive;
   said adjustment sleeve having a lower end;
   tooth means provided for said lower end of said adjustment sleeve;
   said means for moving the pallet receivers comprises an angle orientation device for selectively angularly positioning said pallet thrust drive; and
   said angle orientation device having means coacting with said tooth means.

4. The pallet feeder as defined in claim 3, wherein:
   said angle orientation device includes a pinion defining said means coacting with said tooth means.

5. The pallet feeder as defined in claim 3, wherein:
   said angle orientation device comprises a tooth piston drive defining said means coacting with said tooth means.

6. The pallet feeder as defined in claim 1, wherein:
   said pallet thrust drive further includes a substantially horizontal, radially directed arm having an outer end;
   an index-piston drive means supported by said outer end of said arm;
   said index-piston drive means including an index roll;
   a respective fixed index member provided at each pallet receiver;
   said index roll coacting with the respective fixed index member at each pallet receiver.

7. The pallet feeder as defined in claim 6, wherein:
   each fixed index member at each pallet receiver comprises a fixed index prism.

8. The pallet feeder as defined in claim 1, wherein:
   said pallet thrust drive further includes a coupling element and a drive chain;
   an arm;
   a base member;
   switching and control elements arranged at the chain, upon said arm and in said base member;
   said coupling element coacting with said switching and control elements so as to be movable into a number of thrust positions;
   two plungers essentially vertically guided at the arm for actuating the switching and control elements within the base member;
   said plungers coacting with plunger rods vertically displaceable in said rotatable platform.

* * * * *